US012603243B2

(12) United States Patent
Bernhardt

(10) Patent No.: US 12,603,243 B2
(45) Date of Patent: Apr. 14, 2026

(54) X-RAY EMITTER AND MOBILE X-RAY DEVICE

(71) Applicant: Siemens Healthcare GmbH, Erlangen (DE)

(72) Inventor: Philipp Bernhardt, Forchheim (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 321 days.

(21) Appl. No.: 18/228,888

(22) Filed: Aug. 1, 2023

(65) Prior Publication Data

US 2024/0038478 A1 Feb. 1, 2024

(30) Foreign Application Priority Data

Aug. 1, 2022 (DE) ..................... 10 2022 207 942.6

(51) Int. Cl.
*H01J 35/00* (2006.01)
*H01J 35/06* (2006.01)
*H01J 35/08* (2006.01)
*H01J 35/14* (2006.01)

(52) U.S. Cl.
CPC ............ *H01J 35/08* (2013.01); *H01J 35/064* (2019.05); *H01J 35/14* (2013.01)

(58) Field of Classification Search
CPC .. H01J 2235/165; H01J 35/025; H01J 35/064; H01J 35/08; H01J 35/14; H01J 35/16; H05G 1/10
See application file for complete search history.

(56) References Cited

U.S. PATENT DOCUMENTS 9,374,879 B2 6/2016 Kuroki et al.
2013/0163726 A1* 6/2013 Kuroki .................... H05G 1/10 378/103

FOREIGN PATENT DOCUMENTS

JP 2006344445 A 12/2006
JP 2012109105 A 6/2012

OTHER PUBLICATIONS

LaPotin, Alina, et al. "Thermophotovoltaic efficiency of 40%." Nature 604.7905 (2022): 287-291.
Werner Pluta "Thermal Power Machine Aimes to Enable Thermal Storage" Apr. 14, 2022. pp. 1-5 with English translation.

* cited by examiner

*Primary Examiner* — Dani Fox
(74) *Attorney, Agent, or Firm* — Lempia Summerfield Katz LLC

(57) ABSTRACT

In order to achieve effective cooling, an X-ray emitter with a tube housing having a vacuum is provided. At least one anode is arranged in the tube housing, such that the anode is irradiated by an electron beam generated in a cathode and accelerated through an electrical field. The anode is excited, such that an X-ray deceleration radiation is emitted. The X-ray emitter has a thermoelectric converter (e.g., at least one thermophotovoltaic cell) for generating electrical energy. The thermoelectric converter is arranged, such that the thermoelectric converter may be irradiated at least in part by a heat radiation emanating from the anode.

18 Claims, 3 Drawing Sheets

X-RAY EMITTER AND MOBILE X-RAY DEVICE

This application claims the benefit of German Patent Application No. DE 10 2022 207 942.6, filed on Aug. 1, 2022, which is hereby incorporated by reference in its entirety.

BACKGROUND

The present embodiments relate to an X-ray emitter with a tube housing, an anode, and a cathode, and a mobile X-ray device.

The fundamental procedure for generating X-ray radiation using an X-ray emitter 1 includes releasing, in a tube housing 2 containing a vacuum 12, electrons mostly as a result of heat in a cathode 3. The electrons are then fired as an electron beam 5 through an electrical acceleration field onto a focal point 6 of an opposite anode 4, where the electrons strike with high kinetic energy and are decelerated. During the deceleration process of the electrons in the material of the anode 4, X-ray (e.g., deceleration) radiation 9 is generated, which is used for many medical purposes. Unfortunately, X-ray emitters 1 are generally very inefficient. A large part of the kinetic energy of the electrons accelerated by the high voltage is converted into heat in the material of the anode 4, and only 1% is actually converted into X-ray radiation.

According to the prior art, the heat is to be stored and transported to the outside. The focal point 6 of the anode 4 often consists of tungsten, which has a very high melting point of up to 3,400 degrees. The heat produced heats up the focal point 6, resulting in heat radiation that in turn cools down the body. The heat radiation passes through the vacuum 12 and strikes the housing wall 21 insulating the vacuum 12. One possibility for cooling includes transporting heat out of the housing wall 21 using oil or water. In the case of X-ray emitters 1 with a permanently rotating rotary anode and a focal path 7, the heat is somewhat better distributed. The rotary anode itself consists of materials such as, for example, molybdenum or copper, which discharge the heat quickly into the inside of a rotary anode plate. The heat may then be stored well using a further material with a high thermal coefficient, such as, for example, graphite. The anode may be connected to an outer cooler in order to draw out the heat continuously. At the end, a large quantity of heat is generated with a lower temperature. This is then discharged into the ambient air via ventilators or cooling ribs.

Overall, the cooling of the anode assumes central importance in an X-ray emitter. This applies even more to such X-ray emitters that are subjected, on account of their application, to a load with a prolonged duration in order, for example, to generate a large number of consecutive X-ray recordings.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an X-ray emitter is provided with an effective possibility to reduce the heat produced. As another example, a mobile X-ray device with such an X-ray emitter is provided.

The X-ray emitter according to the present embodiments includes a tube housing having a vacuum, in which at least one anode is arranged, such that the anode is irradiated by an electron beam generated in a cathode and accelerated through an electric field. The anode is excited, such that an X-ray deceleration radiation is emitted. The X-ray emitter includes a thermoelectric transducer (e.g., at least one thermophotovoltaic cell) for generating electrical energy. The thermoelectric transducer is arranged such that the thermoelectric transducer may be irradiated at least in part by a heat radiation emanating from the anode. The present embodiments are based on the knowledge that a strongly heated anode may not only be cooled but also be used to generate power if the heat radiation emanating therefrom is converted by thermoelectric conversion or thermophotovoltaic conversion into electrical energy and thus dissipated. Apart from a particularly good cooling effect, this additionally results in power generation and thus significantly increases the efficiency of the X-ray emitter. Costly additional cooling systems (e.g., in the housing wall) are not necessary. While conventional thermophotovoltaic systems require an additional heat source to be installed, this is already present in the form of the anode in the case of the X-ray emitter and may be used to generate power with minimum outlay. Overall, the unit including the X-ray emitter and the thermoelectric converter (e.g., thermophotovoltaic cells) provides an ideal, mutually beneficial combination that effectively cools the anode/X-ray emitter while simultaneously generating energy or power.

According to one embodiment, a large number of thermophotovoltaic cells that are arranged, such that the thermophotovoltaic cells may be irradiated at least in part by a heat radiation emanating from the anode. In one embodiment, the thermophotovoltaic cells may be arranged in one or a number of modules of an identical or different size. A particularly good cooling effect and also particularly effective power generation may be achieved by covering as large an area as possible with a large number of thermophotovoltaic cells.

Photovoltaic cells and, for example, thermophotovoltaic cells generally have many advantages. For example, they have no mechanical parts and are thus subject to very little wear. Their conversion efficiency is very high because they tap into the heat chain directly at the hot point. Up to 40% of the heat may be drawn electrically out of the X-ray emitter, which massively reduces the load on the heat chain. Thermophotovoltaic cells are particularly effective because a focal point or a focal path of an anode becomes so hot that the focal point or the focal path of the anode emits heat radiation. The efficiency of an X-ray emitter including thermophotovoltaic cells may be increased significantly.

According to a further embodiment, the thermophotovoltaic cell(s) is/are arranged within the tube housing having a vacuum. For example, the thermophotovoltaic cells are arranged on the inner surface of the housing wall of the tube housing, and the sensor area of the thermophotovoltaic cells is directed into the interior space of the tube housing. With such an arrangement, the heat radiation emanating from the anode and, for example, the focal point or the focal path passes through the vacuum unimpeded and without energy loss onto the sensor area of the thermophotovoltaic cells. In this way, power may be generated particularly effectively in the thermophotovoltaic cells.

According to a further embodiment, the anode is formed by a rotary anode that is arranged such that, driven by at least one drive, the anode is rotatable about an axis of rotation. Rotary anodes of this kind are used in X-ray systems because, on account of the rotating plate of the rotary anode and the focal path, the rotary anodes provide better heat distribution and are better suited for continuous operation of the X-ray emitter.

According to a further embodiment, the anode has a focal path or a focal point that consist at least in part of tungsten, and the at least one thermophotovoltaic cell is configured to convert at least part of the heat radiation emanating from the focal path or focal point made from tungsten, which has been heated to at least 1500° C. (e.g., at least 1900° C.), into electrical energy. In order to maximize the electrical efficiency of a thermophotovoltaic system, an optimum spectral adjustment between the heat emitter and the thermophotovoltaic cells may be selected. Therefore, thermophotovoltaic cells that have been adjusted specifically to the temperature of the focal path or the focal point made from tungsten with regard to the band gap of their semiconductor material may be used in order to optimize the efficiency of the X-ray emitter. In this way, a significant part of the heat radiation (e.g., at least 30%) may be converted into electrical energy.

In one embodiment, in order to enable the easy use of the electrical energy generated, at least one power cable for routing the electrical energy generated is connected to the at least one thermophotovoltaic cell, to the large number of thermophotovoltaic cells, or to the thermophotovoltaic modules.

According to a further embodiment, the electrical energy generated is used to operate at least one component of the X-ray emitter. This may be, for example, the cathode, the high-energy field for deflecting the electron beam, or the drive of the rotary anode. The further use of the electrical energy in the X-ray emitter makes it possible to increase the efficiency of the X-ray emitter significantly (e.g., almost double the efficiency) if up to 40% of the electrical energy used may be recovered and used for operation.

The present embodiments also include a medical mobile X-ray device with an X-ray emitter and an X-ray detector. The electrical energy generated in the X-ray emitter is used to operate at least one component of the mobile X-ray device. The energy may thus be used, for example, to operate a collimator, the X-ray detector, a drive for adjusting the C-arm, or the X-ray emitter itself. This is a major step toward an autonomous power supply for a mobile X-ray device that is to be operated as independently as possible from cables.

DETAILED DESCRIPTION

Figure 1:
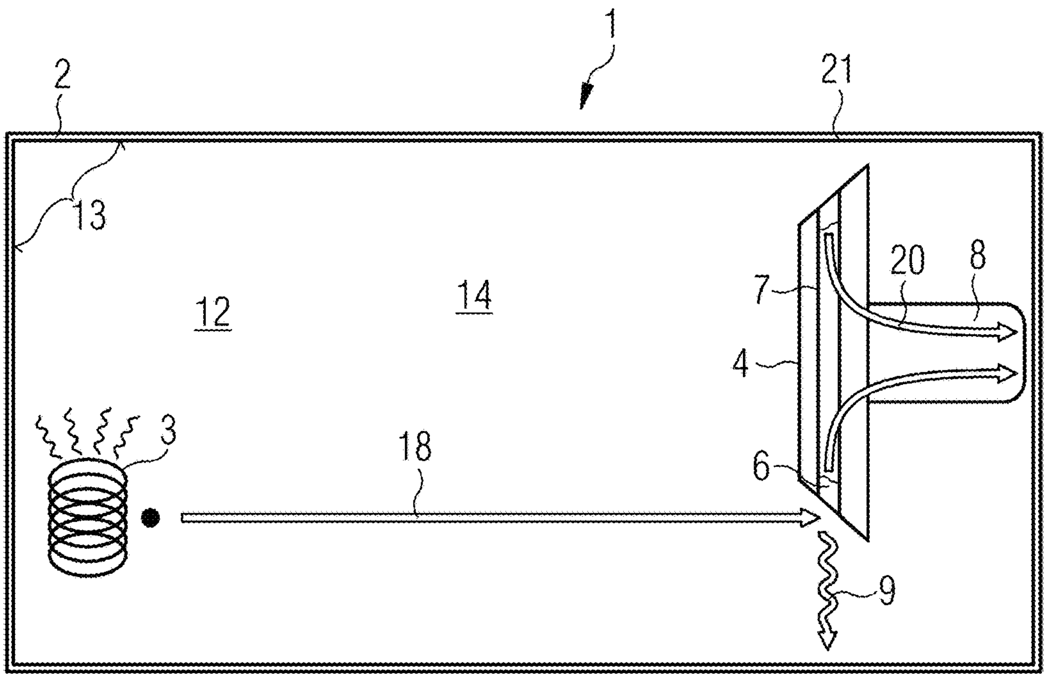
FIG. 1 shows a view of a known X-ray emitter.

FIG. 1 shows a typical X-ray emitter 1 from the prior art, as already described in the introduction, with a cathode 3 for emitting electrons and a rotary anode 4 in an interior space 14 of a tube housing 2. The interior space 14 is delimited by a housing wall 21 and has a vacuum 12. An electron beam 5 is fired through an electrical acceleration field (not shown) onto a point on a focal path 7 (e.g., a focal point 6) of the rotary anode 4 rotating about an anode axis 8. The electrons strike the point with high kinetic energy and are decelerated. During the deceleration process of the electrons, X-ray (e.g., deceleration) radiation 9 is generated and, on account of the low efficiency, the rotary anode 4 (e.g., the focal path 7 and the focal point 6) is heated very strongly.

Figure 2:
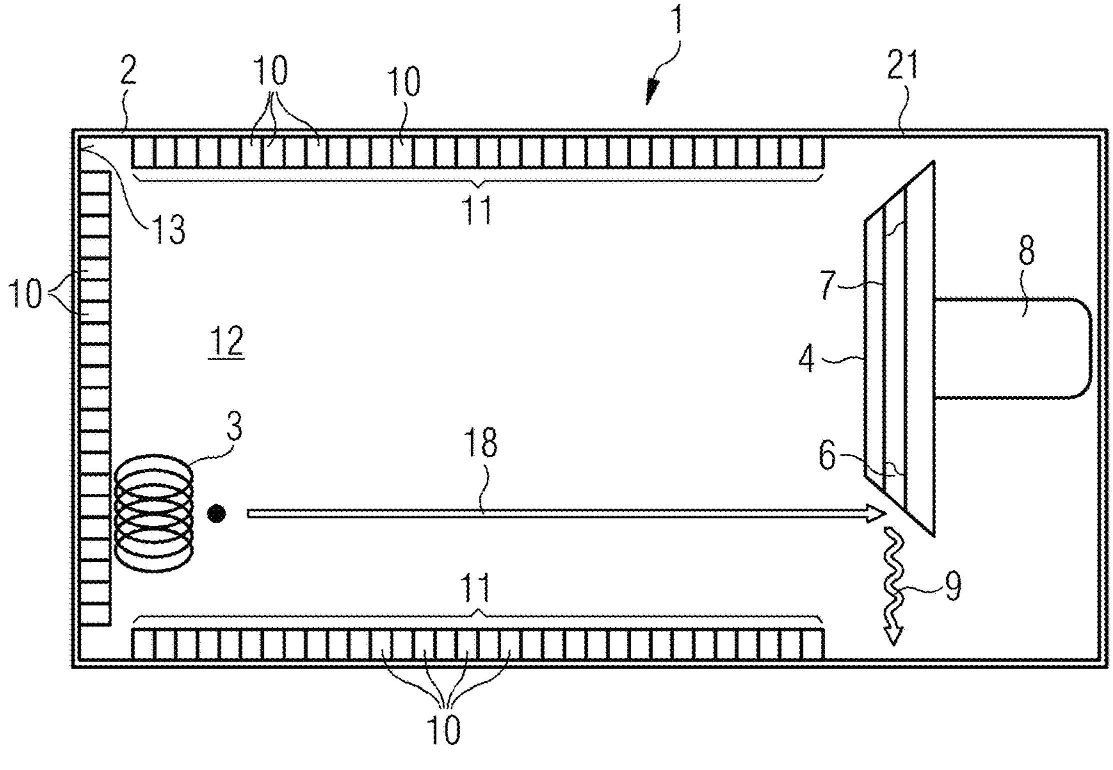
FIG. 2 shows a view of one embodiment of an X-ray emitter with a number of thermophotovoltaic cells.

FIG. 2 shows an X-ray emitter 1, in which a large number of thermophotovoltaic cells 10 are arranged on an inner surface 13 of the housing wall 21. As a result, part of the heat radiation emanating from the rotary anode 4 or the focal path 7 or the focal point 6 is converted into electrical energy and thereby dissipated. The electrical energy may be routed out of the X-ray emitter 1 via power lines in order to reduce the load on the heat chain. The thermophotovoltaic cells 10 are arranged, for example, on the inner surface 13 of the housing wall 21 of the tube housing 2. Sensor areas 11 of the thermophotovoltaic cells 10 are directed into the interior space 14 of the tube housing 2, such that the heat radiation emanating from the rotary anode, the focal path 7, or the focal point 6 reaches the sensor areas 11 particularly well. The thermophotovoltaic cells 10 may also be arranged, such that the thermophotovoltaic cells 10 are in part tilted away from the housing wall 21 or are spaced apart from the housing wall 21. Other arrangements are likewise possible.

In addition, a reflection layer may also be arranged on the housing wall 21 behind the thermophotovoltaic cells 10. The reflection layer reflects the part of the heat that does not contribute to generating power back to the thermophotovoltaic cells 10.

Alternatively, the thermophotovoltaic cells 10 may also be arranged on the outer surface of the housing wall 21 of the tube housing 2 and the sensor areas 11 of the thermophotovoltaic cells 10 directed into the interior space 14 of the tube housing 2, although the housing wall 21 is then to be transparent.

In one embodiment, the thermophotovoltaic cells 10 may be arranged in one or a number of modules of an identical or different size. Particularly effective power generation and thus a particularly good cooling effect may be achieved by covering as large an area as possible with a large number of thermophotovoltaic cells 10.

When tungsten is used, for example, the heat in the focal point 6 may reach very high temperatures of up to 2800° Celsius. The conversion to electrical energy in the thermophotovoltaic cells 10 may work very efficiently at high temperatures significantly above 1500° or above 1900° Celsius. The hot focal point 6 emits a large part of its heat radiation in the form of visible light. A thermophotovoltaic cell 10 that is optimized, for example, exactly to the emitted wavelength may receive this light and convert the light into power.

Figure 4:
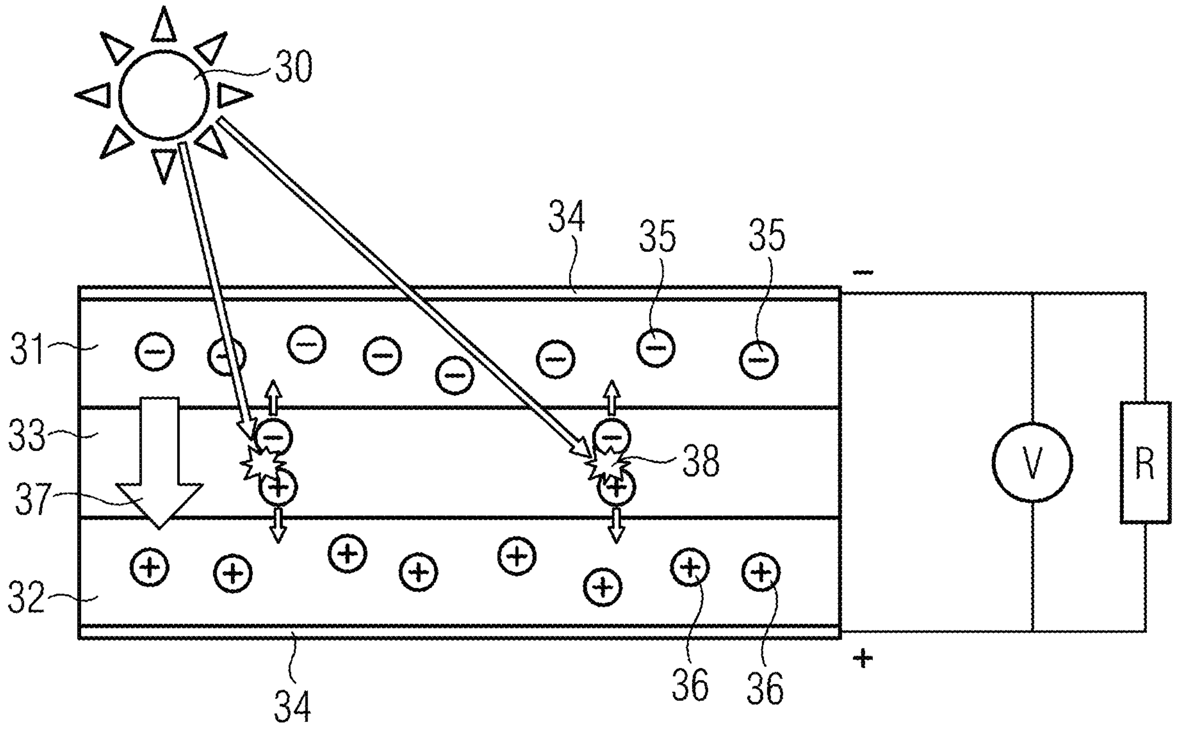
FIG. 4 shows a view of the operating principle of a photovoltaic cell.

Photovoltaic cells basically work using a p-n junction (see FIG. 4). In a thin semiconductor material, for example, the upper layer 31 is n-doped (e.g., electron donors), and the lower layer 32 is p-doped (e.g., electron acceptors); interposed therebetween is a neutral layer 33 in which the superfluous electrons 35 of the donors bind themselves loosely to the holes 36 of the acceptors (e.g., by occupying the empty spaces in the valence band). A constantly present electrical field 37 is formed between an upper contact area and a lower contact area (e.g., between + in the n-doped layer on account of the lack of electrons and – in the p-doped layer on account of the lack of holes). If a photon 38 with an energy that is at least as great as the energy of the band gap of the corresponding material strikes a loosely bound electron-hole pair in the neutral layer 33, then the electron 35 may be released from the binding and lifted into the conduction band. Some of these electrons 35 drift through the electrical field into the n-doped layer 31 and holes 36 into the p-doped layer 32. A voltage and a usable power are generated. A thermophotovoltaic cell 10 works according to the same principle, where, for example, high-energy photons come from an incandescent heat source (e.g., instead of the sun) and the thermophotovoltaic cell 10 is optimized exactly to the emitted wavelength.

Photovoltaic cells generally have many advantages. For example, photovoltaic cells have no mechanical parts and are thus subject to very little wear. A conversion efficiency of photovoltaic cells is very high because the photovoltaic cells tap into the heat chain directly at the hot point. Part of the heat may be drawn electrically out of the X-ray emitter, which massively reduces the load on the heat chain. The efficiency of such an X-ray emitter may be increased significantly.

From the article "Thermophotovoltaic efficiency of 40%" by A. LaPotin et al., https://doi.org/10.1038/s41586-022-04473-y, 2022, innovative high-efficiency thermophotovoltaic cells that work specifically at a temperature of approximately 1900° to 2400° Celsius and achieve an efficiency of 40% in this temperature range are known. For this purpose, the thermophotovoltaic cells have band gaps between 1.0 and 1.4 eV.

In one embodiment, thermophotovoltaic cells 10 that are adjusted specifically to the heat emitter are used. In the present X-ray emitter 1, in terms of efficiency, thermophotovoltaic cells 10 that are adjusted specifically to the focal path 7 or the focal point 6 (e.g., with regard to the band gap of the semiconductor material) may be used. When tungsten is used as the focal path 7 or focal point of the rotary anode 4, the band gap of the semiconductor material is therefore to be adjusted to the emission temperature of tungsten. Thermophotovoltaic cells with band gaps of at least 1.0 eV (e.g., with 1.2 eV, 1.4 eV, or 1.6 eV) may be used. III-V compound semiconductors (e.g., containing materials from groups III and V of the periodic table, which when combined, have the electrical conductivity of semiconductors) may be used as semiconductor materials, for example.

The power obtained from thermophotovoltaic cells may then be used, for example, to drive components of the X-ray emitter 1 (e.g., the cathode 3), the high-energy field for deflecting the electron beam, or for driving the rotary anode 4. The further use of the electrical energy in the X-ray emitter makes it possible to increase the efficiency of the X-ray emitter significantly (e.g., almost to double the efficiency).

Instead of or in addition to the thermophotovoltaic cells, it is also possible to use other thermoelectric converters (e.g., Peltier elements, an alkali-metal thermal to electric converter, or a Stirling engine).

Figure 3:
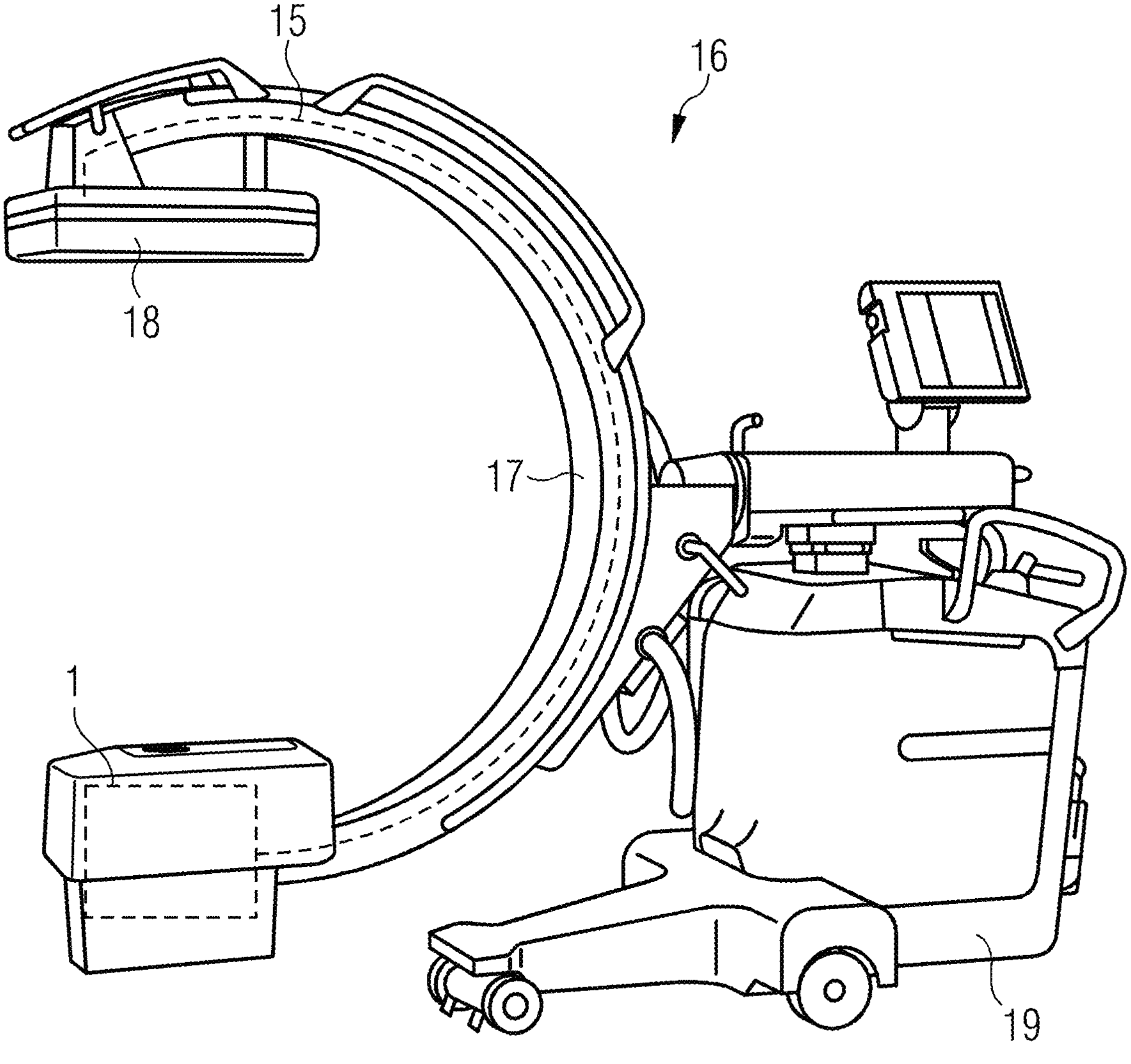
FIG. 3 shows a view of one embodiment of a mobile X-ray device with an X-ray emitter according to FIG. 2.

FIG. 3 shows one embodiment of a mobile X-ray device 16 with a C-arm 17, an X-ray detector 18, and an X-ray emitter 1 with thermophotovoltaic cells 10 arranged for generating power as described above. The mobile X-ray device 16 has a movable device trolley 19 that may be moved manually or automatically using wheels or rollers. The X-ray emitter 1 may use the electrical energy generated as described above for operating a component of the X-ray emitter 1 itself. Alternatively or in addition, using a power cable 15, electrical energy generated may be used to operate at least one component of the mobile X-ray device 16 (e.g., for operating a collimator, the X-ray detector 18, or a drive for adjusting the C-arm 17). This is a major step toward an autonomous power supply for a mobile X-ray device 16 that is to be operated as independently as possible from external cables.

An X-ray emitter 1 with thermophotovoltaic cells 10 arranged for generating power as described above may also be used for any other X-ray device (e.g., for a C-arm X-ray device that is installed in a fixed manner, such as on the ceiling, wall, or floor, for a CT device, or for a biplane X-ray device).

The present embodiments may be briefly summarized as follows. In order to achieve particularly efficient cooling, provision is made for an X-ray emitter 1 with a tube housing 2 having a vacuum, in which at least one anode 4 is arranged such that the anode 4 is irradiated by an electron beam 5 generated in a cathode 3 and accelerated through an electrical field, and excited in order to emit an X-ray deceleration radiation 9. The X-ray emitter 1 has a thermoelectric converter (e.g., at least one thermophotovoltaic cell 10) for generating electrical energy. The thermoelectric converter is arranged such that the thermoelectric converter may be irradiated at least in part by a heat radiation emanating from the anode 4.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An X-ray emitter comprising:

a tube housing having a vacuum, in which at least one anode is arranged, the at least one anode being irradiatable by an electron beam generated in a cathode and accelerated through an electrical field, and excited, such that an X-ray deceleration radiation is emitted; and a thermoelectric converter configured to generate electrical energy, the thermoelectric converter being arranged, such that the thermoelectric converter is irradiatable at least in part by a heat radiation emanating from the anode.

2. The X-ray emitter of claim 1, wherein the thermoelectric converter comprises at least one thermophotovoltaic cell.

3. The X-ray emitter of claim 2, wherein the at least one thermophotovoltaic cell comprises a number of thermophotovoltaic cells that are arranged, such that the number of thermophotovoltaic cells are irradiatable at least in part by a heat radiation emanating from the anode.

4. The X-ray emitter of claim 3, wherein the number of thermophotovoltaic cells are arranged within the tube housing having the vacuum.

5. The X-ray emitter of claim 4, wherein the number of thermophotovoltaic cells are arranged on an inner surface of a housing wall of the tube housing, and a sensor area of the number of thermophotovoltaic cells is directed into an interior space of the tube housing.

6. The X-ray emitter of claim 1, wherein the anode is formed by a rotary anode that is arranged, such that, driven by at least one drive, the rotary anode is rotatable about an axis of rotation.

7. The X-ray emitter of claim 2, wherein the anode has a focal path or a focal point consisting at least in part of tungsten, and the at least one thermophotovoltaic cell is configured to convert at least part of the heat radiation emanating from the focal path or the focal point made from tungsten, which has been heated to at least 1500° C., into electrical energy.

8. The X-ray emitter of claim 2, wherein at least one power cable for routing the electrical energy generated is connected to the at least one thermophotovoltaic cell.

9. The X-ray emitter of claim 1, further comprising at least component configured to be operated using the electrical energy generated.

10. A medical mobile X-ray device comprising:
- an X-ray emitter comprising:
  - a tube housing having a vacuum, in which at least one anode is arranged, the at least one anode being irradiatable by an electron beam generated in a cathode and accelerated through an electrical field, and excited, such that an X-ray deceleration radiation is emitted; and
  - a thermoelectric converter configured to generate electrical energy, the thermoelectric converter being arranged, such that the thermoelectric converter is irradiatable at least in part by a heat radiation emanating from the anode; and
- an X-ray detector, in which the electrical energy generated usable to operate at least one component of the mobile X-ray device.

11. The medical mobile X-ray device of claim 10, wherein the thermoelectric converter comprises at least one thermophotovoltaic cell.

12. The X medical mobile X-ray device of claim 11, wherein the at least one thermophotovoltaic cell comprises a number of thermophotovoltaic cells that are arranged, such that the number of thermophotovoltaic cells are irradiatable at least in part by a heat radiation emanating from the anode.

13. The medical mobile X-ray device of claim 12, wherein the number of thermophotovoltaic cells are arranged within the tube housing having the vacuum.

14. The X medical mobile X-ray device of claim 13, wherein the number of thermophotovoltaic cells are arranged on an inner surface of a housing wall of the tube housing, and a sensor area of the number of thermophotovoltaic cells is directed into an interior space of the tube housing.

15. The medical mobile X-ray device of claim 10, wherein the anode is formed by a rotary anode that is arranged, such that, driven by at least one drive, the rotary anode is rotatable about an axis of rotation.

16. The medical mobile X-ray device of claim 11, wherein the anode has a focal path or a focal point consisting at least in part of tungsten, and the at least one thermophotovoltaic cell is configured to convert at least part of the heat radiation emanating from the focal path or the focal point made from tungsten, which has been heated to at least 1500° C., into electrical energy.

17. The medical mobile X-ray device of claim 11, wherein at least one power cable for routing the electrical energy generated is connected to the at least one thermophotovoltaic cell.

18. The medical mobile X-ray device of claim 10, wherein the X-ray emitter further comprises at least component configured to operated using the electrical energy generated.

* * * * *